(12) United States Patent
McDonald (10) Patent No.: US 6,441,777 B1
(45) Date of Patent: Aug. 27, 2002

(54) SIGNAL STRUCTURE AND PROCESSING TECHNIQUE FOR PROVIDING HIGHLY PRECISE POSITION, VELOCITY, TIME AND ATTITUDE INFORMATION WITH PARTICULAR APPLICATION TO NAVIGATION SATELLITE SYSTEMS INCLUDING GPS

(76) Inventor: Keith D. McDonald, 6134 Beachway Dr., Falls Church, VA (US) 22041

( * ) Notice: Subject to any disclaimer, the term of this patent is extended or adjusted under 35 U.S.C. 154(b) by 0 days.

(21) Appl. No.: 09/755,191

(22) Filed: Jan. 8, 2001

Related U.S. Application Data

(63) Continuation-in-part of application No. 09/302,365, filed on Apr. 30, 1999, now Pat. No. 6,172,639.
(60) Provisional application No. 60/083,674, filed on Apr. 30, 1999, and provisional application No. 60/098,177, filed on Aug. 26, 1998.

(51) Int. Cl.$^7$ .............................................. H04B 7/185
(52) U.S. Cl. ............................ 342/357.06; 342/357.01; 342/461
(58) Field of Search .................. 342/357.01, 357.04, 342/357.06, 104, 461; 701/213

(56) References Cited

U.S. PATENT DOCUMENTS 6,172,639 B1 * 1/2001 McDonald ............. 342/357.06

* cited by examiner

*Primary Examiner*—Dao Phan
(74) *Attorney, Agent, or Firm*—Blank Rome Comisky & McCauley LLP (57) ABSTRACT

In a GPS or similar radionavigation signal, a pair of coarse/acquisition signals are located at, near or toward the nulls of the precision/encrypted codes in the L1 band, the L2 band or both. The resulting difference in frequency provides a very wide lane capability. The existing centered coarse/acquisition signal can be retained for legacy purposes. When a receiver receives such signals, it first determines position (speed, time, attitude, etc.) in accordance with the signals having the smallest frequency difference and thus the widest lane and then proceeds to each narrower lane to refine the accuracy of the determination.

1 Claim, 8 Drawing Sheets

FIG. 5(a)
CURRENT GPS L1 & L2 SIGNAL CONFIGURATION (SINCE 2/78). PLANNED GLONASS L1 & L2 SIGNALS INDICATED (ITU 2005).

FIG. 5(b)
SECOND CIVIL SIGNAL (L2c) PROPOSED FOR L2 BAND CENTER. L1cm IS L1 C/A-CODE, USED BY BOTH CIVIL AND MIL. USERS.

FIG. 5(c)
USAF/JPO PLANNED NEW Ln. L1/L2 FREQ. RE-USE PROPOSAL. INCORP'D MANCHESTER MODUL. CIVIL SIGNALS AT L1 & L2 CTRS. (PROPOSED BY JPO-7/97)

FIG. 5(d)
PROPOSED DOD SOLE USE OF L2.
CIVIL L2c SHIFTED TO ARNS.
L1 RE-USE, AS ABOVE.

FIG. 5(e)
CIVIL SPLIT-SPECTRUM
SIGNAL PROPOSAL (KM 8/97):
C/A AT L2 & L1 P/Y-NULLS.
L1cm REQUIRED FOR LEGACY.

FIG. 5(f)
L1c SPLIT SPECTRUM SIGNALS
(& L1n) SHIFTED +10.23 MHz.
BENEFIT: REMOVES 1 C/A-CODE.
(L2 SPLIT SPECT REC'D BY
IRT /JS 3/98)

FIG. 5(g)
PROPOSED DOD SOLE USE OF L2.
CIVIL L2c'S MOVED TO ARNS.
CIVIL SPLIT SPECTRUM IN L1.

Figure 6.

SIGNAL STRUCTURE AND PROCESSING TECHNIQUE FOR PROVIDING HIGHLY PRECISE POSITION, VELOCITY, TIME AND ATTITUDE INFORMATION WITH PARTICULAR APPLICATION TO NAVIGATION SATELLITE SYSTEMS INCLUDING GPS

REFERENCE TO RELATED APPLICATIONS

This application is a continuation-in-part of U.S. patent application Ser. No. 09/302,365, filed Apr. 30, 1999, now U.S. Pat. No. 6,172,639, which in turn claims the benefit of U.S. Provisional Application No. 60/083,674, filed Apr. 30, 1998, and No. 60/098,177, filed Aug. 26, 1998. The disclosures of all of the above-referenced applications are hereby incorporated by reference in their entireties into the present disclosure.

FIELD OF THE INVENTION

The present invention is directed to obtaining highly precise position, velocity, time and attitude measurements and their time derivatives by the use and processing of multiple signals separated in frequency and by the use of these signals and their sum and difference components. One application of this multiple signal measurements technique is in the resolution of the integer cycle ambiguities associated with precise carrier phase measurements of the signals used in satellite navigation systems such s the U.S. Global Positioning System (GPS), or the Russian Global Orbiting Navigation Satellite System (GLONASS), or other systems. One implementation of this multiple signal technique is to use dual or "split spectrum" signals that involves a moderate frequency separation of the signals (or signal energy), and employs an additional signal or signals separated by a greater amount(s) to provide for the progressive resolution of the integer cycle wavelength ambiguities associated with progressively more narrow lane widths (or difference frequency wavelengths). This process continues until the relative phase of the carrier itself is measured and the integer cycle wavelength ambiguities of the carrier signals are also resolved. The technique of the invention involves a signal structure with three or more signal components normally operating in one or more of the bands assigned to GPS, GLONASS or other systems. These signals are used in combination with one or more additional signal(s) at frequencies substantially separated from the dual, or split spectrum, signals. This approach provides significant performance improvements over conventional implementations and can be configured in various ways. The system performance improvements compared to currently available systems include improved accuracy, integrity, availability, continuity, and reductions in the time intervals required to obtain a navigation (or related) determination and in the capabilities of the user equipment to operate dynamically, and/or in a signal interference environment.

BACKGROUND OF THE INVENTION

The United States, the Russian Federation and others (including the Europeans) have established, or plan to establish, orbiting satellite navigation systems. The GPS system, the GLONASS system and other systems, employ constellations of orbiting satellites which transmit signals to receivers on the earth (ground, airborne, marine) and in space which are used to determine precise three-dimensional position, velocity and time (e.g., latitude, longitude, altitude, 3D velocity and time) and in some cases angle (e.g., vehicle attitude) as well as differences and time derivatives of these parameters. Such signals can be used, for example, for navigation, surveying, timing, positioning and for measuring dimensional and other changes over time. Both the GPS and GLONASS systems use two separated bands of frequencies in the L-band portion (~1–2 GHz) portion of the electromagnetic spectrum. These bands have been allocated for radionavigation satellite services by the International Telecommunications Union (ITU).

In the case of both the GPS system and the GLONASS system, the frequency bands are designated L1 for the higher frequency band and L2 for the lower frequency band. A detailed description of the signal structure used for the GPS system is provided in Kayton, M. and W. R. Fried, Avionics Navigation Systems, 2d Ed., Chapter V, Satellite Radionavigation by A. J. Van Dierendonck, Section 5.5.5 GPS Signal Structure, pp. 213–282, John Wiley and Sons, Inc., New York, N.Y., 1997, which description is hereby incorporated by reference herein.

Figure 1:
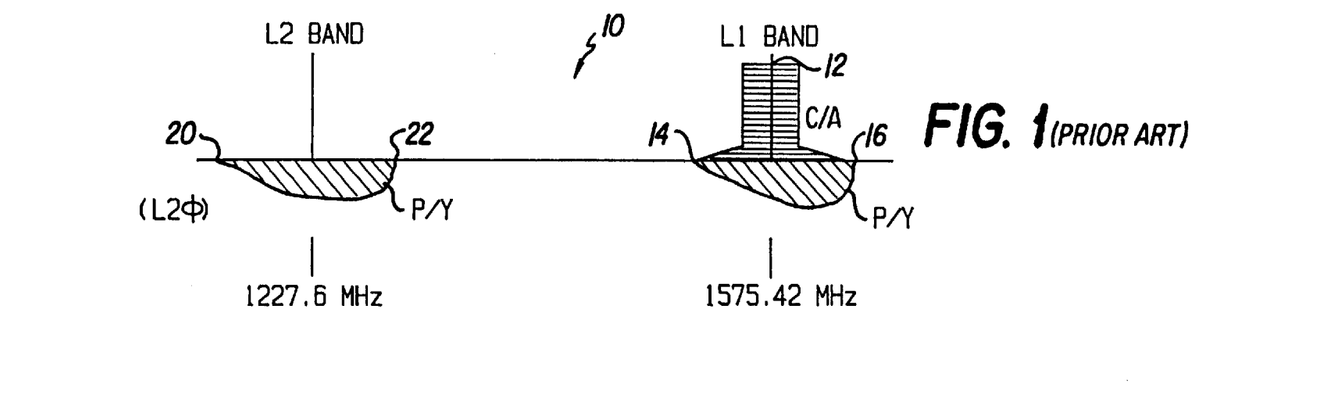
FIG. 1 is a schematic diagram of the present signal structure and band occupancy associated with the GPS radionavigation satellite system.

Referring to the drawings, FIG. 1 shows the existing GPS signal structure, generally designated by reference numeral 10. In FIG. 1, C/A designates the existing GPS coarse/acquisition code modulation on the L1 carrier, while P/Y indicates the GPS precise/encrypted code modulation of the L1 and L2 carriers, and L2φ indicates the "carrier phase" part of the P/Y-code signal at L2 that is authorized for civil use (for ionospheric correction).

For the L1 band, the signal energy of the C/A-code is concentrated at the center of the bands 12, with very little C/A-code energy at or near the P/Y-code nulls 14,16. For the L2 band, there is no C/A-code signal centered in the band 18 and no C/A-coded signal at or near the P/Y-code nulls 20,22.

Throughout the drawings, the frequency occupancies of the bands (to their first spectral nulls) are shown, not the shape of the waveform, or signal power distribution, of each band. Those skilled in the art who have reviewed the present disclosure will readily appreciate the waveform shape in each situation.

Known systems have a number of drawbacks including the following: First, civil (Standard Positioning Service, or SPS) accuracy for differential systems using C/A-code corrections is normally to within several meters. To obtain accuracy within centimeters or decimeters adds considerable cost and complexity to the user equipment and is reliably achieved only by the use of techniques involving differential measurements of the carrier phases of the received signals. One problem in achieving high accuracy is the need to resolve the integer cycle wavelength ambiguity associated with the carrier phase measurements. To accomplish this with the current signal structure now requires the use of sophisticated and expensive software processing, moderate to long observation periods for high accuracy, statistical estimates of the probabilities associated with the observations and careful measurements of the effects of the troposphere, the ionosphere and other error contributors on the signals, especially at large differential system (reference to rover) separation distances. Second, the signal modulations currently provided for civil and military uses (e.g., C/A-codes and P/Y-codes) have maxima near one another or are collocated in frequency (e.g., , both the C/A-codes and the L1 P/Y-codes for GPS are centered at the GPS L1 center frequency). This arrangement is undesirable for some military purposes as well as for some civil applications.

SUMMARY OF THE INVENTION

It is therefore the object of the invention to improve accuracy and other performance characteristics at a moderate cost.

It is a further object of the invention to separate the signals available for civil use from the maxima of the signals for military use. This can be accomplished by (a) moving the civil signals away from the center of the band if the planned military signals (Lm) are to occupy the center of the band, or (b) moving the planned military signals away from the center of the band if the existing and planned civil signals are to be in the center of the band. While the first option (a) will be disclosed in detail, either can be used.

To achieve the above and other objectives, the present invention improves position, velocity, time and angle (attitude) determinations obtained by user equipment receiving radionavigation satellite (or other) signals by establishing and exploiting a new signal structure. This signal structure provides a number of features including means for rapidly and accurately resolving the carrier cycle integer ambiguities in the use of the signals for carrier phase measurement applications. This is accomplished by user systems using three (3) or more signals obtained from four (4) or more satellite (or other) signal transmitters. Specifically, addressing the use of the designated signal structure with GPS signals (and applicable to GLONASS and other signals), the existing signal structure for the GPS L1 band or the L2 band, or both, is modified to use dual (or split spectrum) signals. One representative implementation of the technique would be to use a pair of GPS coded signals (such as coarse acquisition, or C/A-code, signals, or other coded signals) at, or near (within several MHz, e.g., 2 to 6 MHz) of the P/Y-code nulls. The P/Y-code nulls refer to the GPS precision coded (PPS or P-coded) signals, with bi-phase modulation of the GPS carriers at bit rates of 10.23 Mbps for GPS and 5.11 Mbps for GLONASS. For GPS, the Y-code is the secure version of the GPS P-code, and is at the P-code bit rate. The first nulls of these codes occur at a frequency offset above and below their carrier center frequencies by the code bit (or "chipping") rate and these frequencies thereby constitute a first lower null and a first upper null. In the case of the L2 band, a first coded signal could be located near (or at) the frequency corresponding to the lower P/Y-code null and a second coded signal could be located near (or at) the frequency corresponding to the upper P/Y-code null. In the case of the L1 band, a third coded signal could be located near (or at) the frequency corresponding to the lower P/Y-code null and a fourth coded signal could be located near (or at) the frequency corresponding to the upper P/Y-code null. This provides an arrangement in which the signals are separated in frequency such that the wavelength of the difference frequency between the signal frequencies at L1 and the signal frequencies at L2 (the wavelength of said difference frequency is the "wide-lane") are of a dimension large enough to be resolvable by other available measurements. For example, if the sets of signal frequencies (the dual, or split spectrum signals) at L1 and at L2 are separated by 20 MHz, the difference wavelength, or wide-lane, is c/20 MHz (where c is the speed of light: $\sim 3\times 10^8$ meters per second), or 15 meters. Similarly, for a third frequency separated from one of these signals by 50 MHz, then the wide-lane wavelength is about 6 meters in dimension. The cycle ambiguity of the 6 to 15 meter wide-lane is resolvable in user equipment by the use of conventional code (C/A-code or P/Y-code) processing capabilities of GPS, GLONASS and other systems, either on a stand-alone basis or by employing code differential techniques.

The initial wide-lane for each signal can be established through the use of the dual, or split spectrum, signal structure described. Resolution of the ambiguities of the wide-lanes are accomplished by the use of straightforward code, or differential code, ranging techniques similar to the current methods for obtaining one to six meter accuracy for GPS, GLONASS or other systems. Phase measurements at the wide-lane signal wavelength are then obtained for each of the satellite (or other transmitted) signals that correspond to the observer position. Then a more widely spaced set of two signal frequencies transmitted by the satellites (or other transmitters) is selected that provides a difference signal with a narrower lane width (or difference frequency wavelength).

For example, the separation between the GPS signal frequencies centered at L1 and L2 (~358.82 MHz) could be used to provide a narrow lane (wavelength) of about 86 cm. Phase measurements of the wide lane (15 m.) signals allows the resolution of the ambiguities of the narrow lane (86 cm.) signals. A set of phase measurements is then made of the difference frequencies forming the narrow lanes (the 86 cm lanes). At this point, direct measurements can be made of, for example, the GPS L1 carrier frequency signal phases that have a wavelength (at 1575.42 MHz) of about nineteen centimeters. The integer ambiguities of the L1 carrier signal wavelengths (19 cm.) are resolved by the use of the phase measurements of the narrow lane (86 cm.) signals. Relative phase measurements of the carrier signal wavelength provides a final high precision ranging measurement. For example, a three degree relative phase resolution of the carrier wavelength measurement provides a ranging precision of about two millimeters.

In this exemplary configuration, a coded signal could also be located (or retained) for backward compatibility purposes at the carrier frequency corresponding to the current C/A-code of the GPS signal in the L1 band.

The present invention offers the advantage of permitting GPS and other users to obtain accurate position, velocity, time, attitude and other information, from measurements obtained between a user, a differential reference receiver and a set of spacecraft emitters (such as GPS Satellites), or other emitters, ioncluding ground-based emitters. These measurements are of range, range difference, range rate (singly or in combination), differential carrier phase and phase differences, using three or more separate signals operating at differing frequencies such that the signals provide a means for establishing the range, range difference, carrier phase and phase difference as well as the integer cycle ambiguities associated with measurements of the relativecarrier phase of the signals. The multiple, step-wise resolution of the differential carrier phase integer cycle ambiguities is a significant aspect of the present invention.

DETAILED DESCRIPTION OF THE PREFERRED EMBODIMENTS

Figure 2:
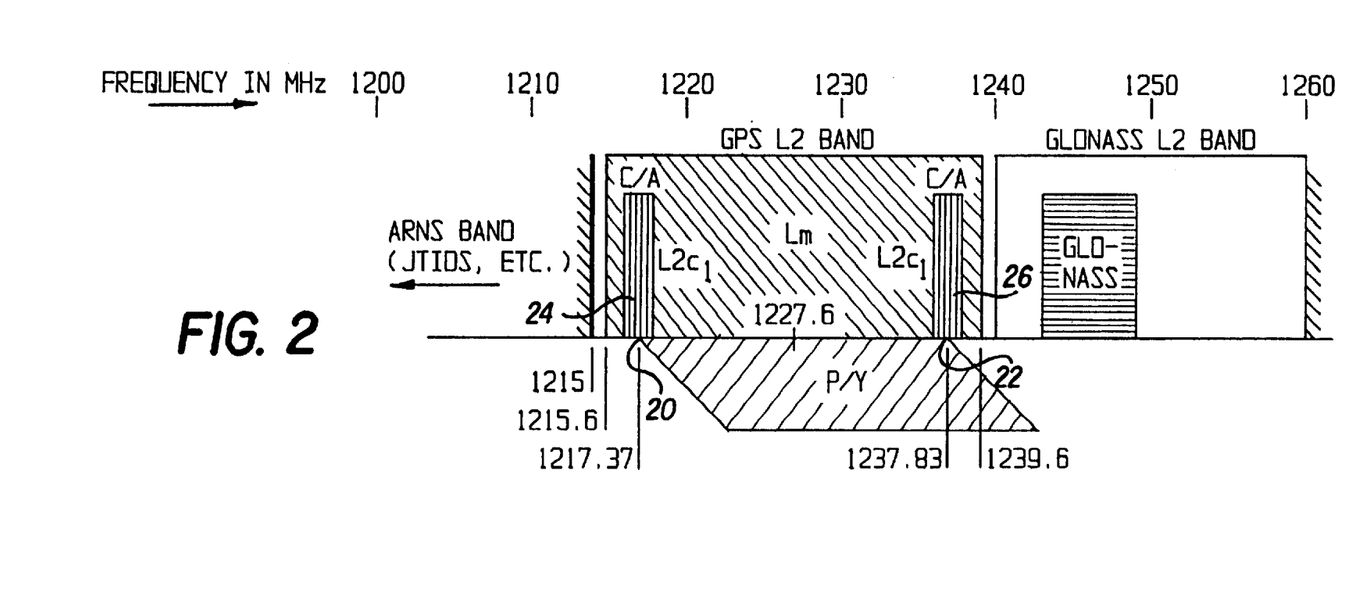
FIG. 2 is a schematic diagram of the general signal structure of the present invention as applied to the L2 band of the GPS radionavigation satellite system. This movement of coded signals away from the center of the band could represent either civil or military signals. Split spectrum signals separated into the P/Y-code nulls are shown in the figure; however, the separation could be substantially less (e.g., 5–7 MHz).

Preferred embodiments will now be set forth in detail with reference to the drawings, in which like reference numerals or alphanumeric designations indicate like features throughout. Referring to FIG. 2, a pair of coded civil signals 24,26 (C/A-code or other) is placed at, or near, the P/Y-code nulls 20,22 of the GPS bands, as is shown for the dual signals 24,26 in the L2 band. In FIG. 2, Lm indicates the military link signal, ARNS indicates the band for aeronautical radionavigation services, and JTIDS indicates frequencies usable for the DoD Joint Tactical Information Distribution System.

Figure 3:
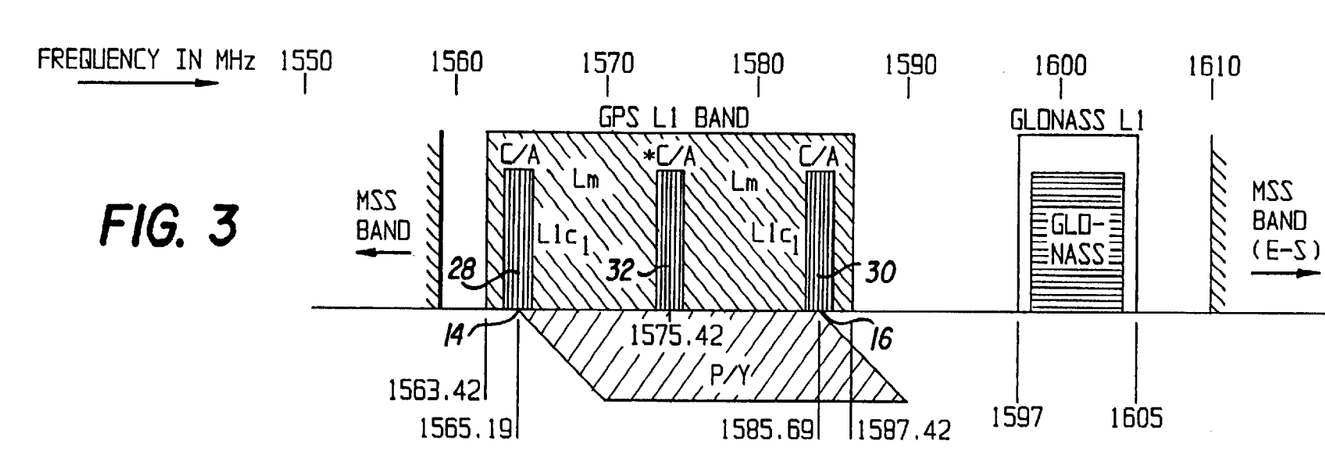
FIG. 3 is a schematic diagram of one implementation of the signal structure of the present invention as applied to the L1 band of the GPS radionavigation satellite system. Although the diagram addresses the movement of civil signals (e.g., C/A coded signals), the technique is equally applicable to the movement of the planned military signals. This could involve a split spectrum configuration with a different code rate and a different (smaller) signal separation in frequency.

Similarly, referring to FIG. 3, a pair of coded civil signals 28,30 (e.g., C/A-code) are placed at or near the P/Y-code nulls 14,16 of the L1 band. The existing centered C/A signal is designated by element numeral 32. MSS identifies the band for mobile satellite services (below 1559 MHz and 1610–1626.5 MHz).

A principal advantage of the arrangement of FIGS. 2 and 3 is that the pair of coded civil signals (C/A-coded, or a variant) provides a "very wide lane" capability by using the 20.46 MHz difference in frequency (e.g., the 20.46 MHz separation) between the coded signals to provide a very wide lane, in this case about 14.7 meters. This very wide lane, used in combination with the current L1/L2 wide lane (86 cm, resulting from the difference in frequency between L1 and L2 of 357.82 MHz) or with other multiple signal measurement techniques, provides highly advantageous capabilities for determining accurate precise position, velocity and time (PVT) and related performance enhancements to GPS (and similarly to GLONASS). This technique can be used for real time operations or on a post processed basis to obtain unambiguous decimeter to mm values of precise position; mm/sec. or better values of velocity; nsec values of time and similar precision in attitude measurements (50–100 $\mu$Radian). The dual (or split spectrum) signal arrangement also provides improved signal integrity, availability and continuity features. This arrangement is especially important and beneficial in the L2 band since this frequency band is not "protected" internationally by ITU agreement. The GPS operations in the L2 band are co-primary with radiolocation systems that include many radar systems with emissions that may interfere with GPS signals in the L2 band. With dual signals, it is highly unlikely that a radar signal would simultaneously interfere with two GPS signals separated by about 10–20 MHz. Therefore, the probability or confidence level, of having access to at least one of the two L2 band signals would be very high. Implementation of the dual signal arrangement in the L1 band also provides highly desirable capabilities. Since this band is protected by the ITU regulations, the L1 band provides a very high level of availability for (both) of the dual signals in the L1 band. It is use of the dual signals which ensures rapid and reliable determination of the carrier phase integer ambiguities, thereby assuring rapid, unambiguous, accurate determinations of position, velocity, time, attitude and changes in these parameters.

The three to five signal arrangement (one or two split spectrum signals with the existing (legacy C/A-coded signals at L1) avoids the degradation effects (termed fratricide by the DoD) on the military P/Y-code signals in the event that the civil signals (e.g., the split spectrum and the C/A-coded signals) need to be denied to an adversary. Providing civil-military separation by arranging one set of signals to occupy a different part of the band(s) than the other set, is an advantageous arrangement for increased flexibility as well as for interference and jamming considerations.

The dual signal concept of the present invention requires alteration of existing GPS agreements, procedures and future spacecraft. Among these alterations are the additional spacecraft power required for the additional coded civil signals (possible in each band) and the somewhat greater burden placed on the DoD to deny an adversary access to the signals. The paired signal or split spectrum approach is also appropriate for implementation in the current GPS L2 band as the "second coded civil signal" and may satisfiy stated DoD and DoT requirements. However, those skilled in the art who have reviewed the present disclosure will readily appreciate the required modifications to hardware and software.

Figure 4:
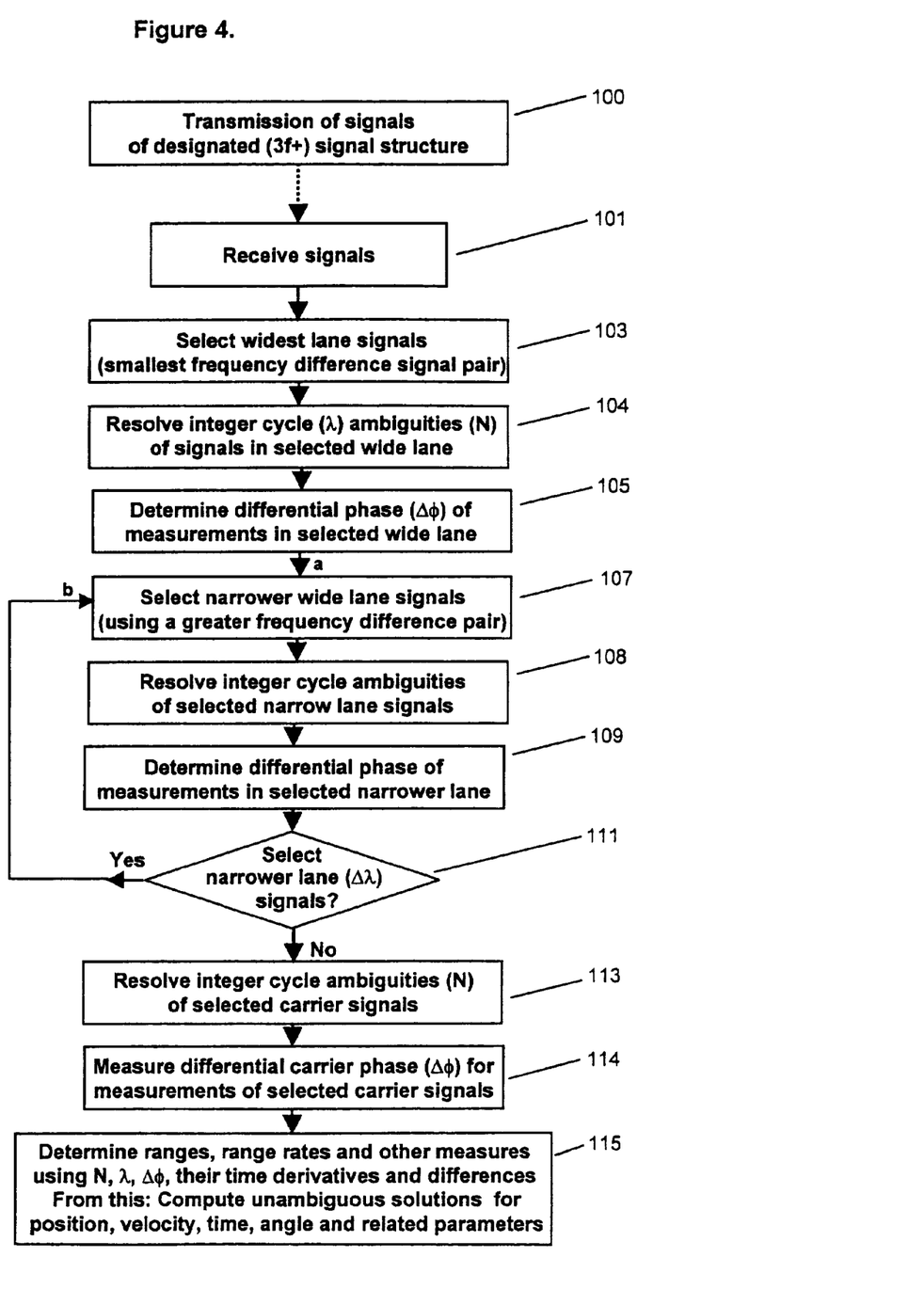
FIG. 4 is a flow chart showing a sequence of operations which a receiver can perform upon receipt of a signal structure such as that shown in FIG. 2 or FIG. 3.

Although those skilled in the art will also readily appreciate the manner in which a signal such as that of FIG. 2 or 3 is to be used, an overview of a particular procedure be set forth with reference to the flow chart of FIG. 4, which is a flow chart showing the sequence of operation for a receiver for processing transmitted signals having a signal structure with three or more separated frequency components, at least one of the signals being modulated. It is not necessary for all signals to be modulated. In general, one modulated signal is sufficient. In step 100, appropriately arranged GPS, or other, signals are transmitted from GPS spacecraft (or other transmitters) and these signals propagate through space and reach the earth. In step 101, a receiver receives signals emitted from the satellites, ground transmitters, or the like. In step 103, the receiver takes the widest lane which corresponds to the smallest frequency difference between the available set of received signals, as wavelength and frequency vary inversely. The inverse variation results from the relationship between wavelength and frequency, which is well known from basic physics. That is, wavelength and frequency are inversely proportional to each other, with the proportionality constant begin c, the speed of light. As a result if $\Delta f$ is the frequency difference between signals, the corresponding wavelength $\lambda$ is given by $\lambda=c/\Delta f$. In step 104, the integer cycle ambiguity of the wide-lane signal is resolved by use of conventional (e.g., in GPS) unaided code or differential code measurements of the ranges. The error in this determination is typically at the meter level for civil DGPS systems, which is sufficient to resolve the cycle ambiguity for wide-lanes of about 6 meters or greater.

In step 105, the receiver determines the relative (differential) phase values for the widest lane signals. Step 105 can be carried out in accordance with known differential phase measurement techniques. This measurement provides the information needed for the resolution of the next narrow-lane ambiguity. In step 107, a narrower lane (using signals with a larger frequency difference) is taken, and in step 108, the narrower-lane integer cycle ambiguity is resolved using the wide-lane phase measurement obtained in step 105. In step 109, the phase of that narrower-lane is measured. If it is determined in step 111 that still narrower-lanes (larger frequency differences) need to be considered then steps 107, 108 and 109 are repeated until all lanes from the widest to the narrowest have been considered. The phase of each lane except the narrowest allows a resolution of integer cycle ambiguity of the next narrower lane. The phase of the narrowest lane allows a resolution of the integer cycle ambiguities of a carrier signal, typically the L1 or L2 carriers in GPS.

Step 113 uses the narrow lane phase measurements from step 109 to resolve the carrier signal cycle ambiguities. Step 114 provides a measurement of the differential carrier phases of the carrier signals employed. This provides the final ranging precision required in the implementation of the technique. Step 115 determines the precise position, velocity, time and other parameters using the wide-lane, narrower lane(s) and carrier signal phase measurements to determine integer cycle ambiguity values and from this the precise ranging and related information. The progressive ambiguity resolution will be further understood from the diagram of FIG. 6.

Figure 6:
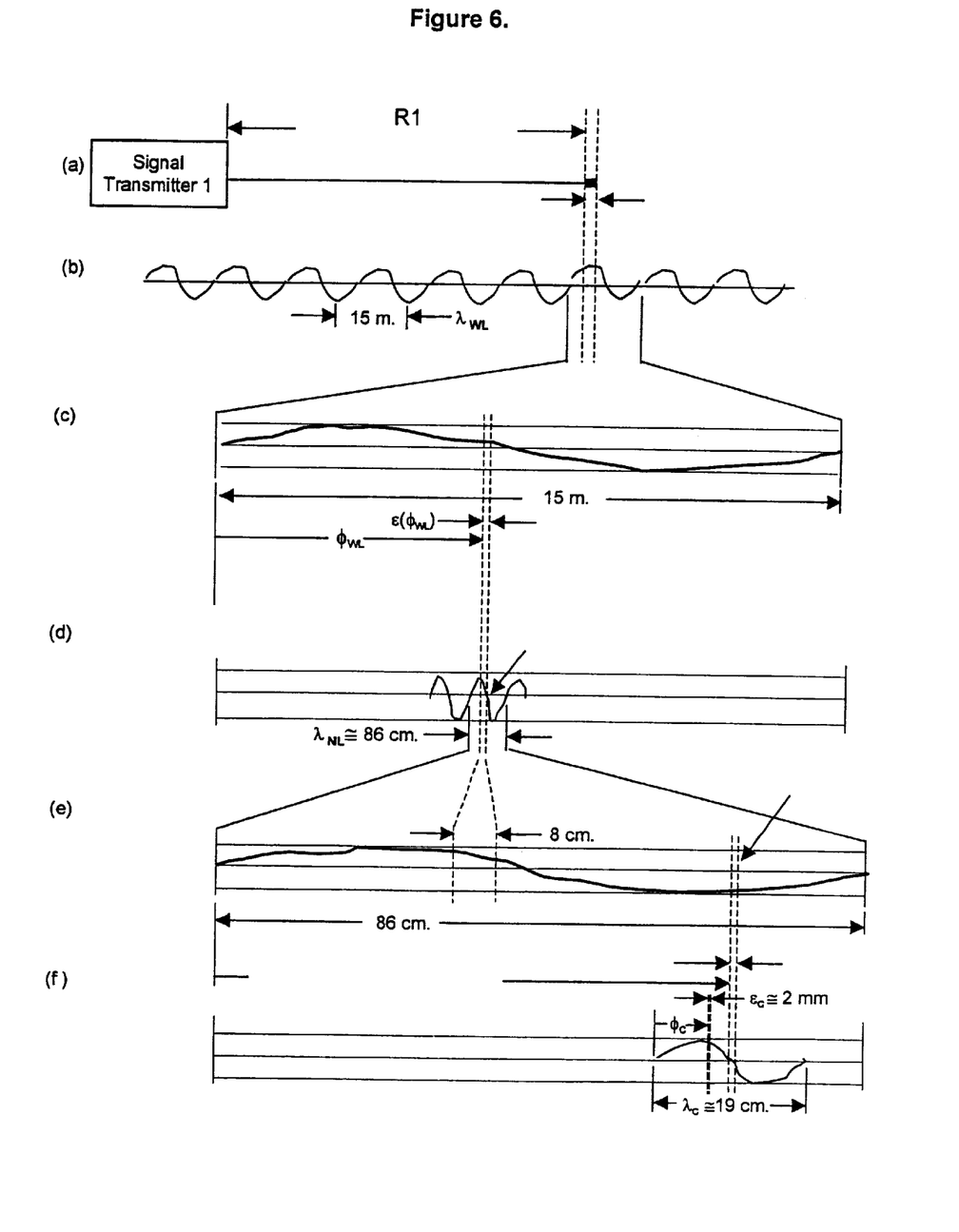
FIG. 6 shows a progressive ambiguity resolution technique using three or more signal frequencies for high-precision measurements of position, velocity, time, and other parameters.

FIG. 6 shows a progressive ambiguity resolution technique using three or more signal frequencies for high precision measurements of position, velocity, time and other parameters. The figure illustrates a method for obtaining highly precise measurements of the user ranges to satellite or other transmitters by the progressive use of signals involving differential or unaided code measurements, wide-lane relative phase measurements, and progressively smaller narrow-lane relative phase measurements which in combination directly resolve all integer cycle ambiguities. The relative phase measurements of one or more of the carrier signals and ranging double differences (if needed) to minimize errors are then employed to obtain precision determinations of position, velocity, time and other parameters.

In FIG. 6, part (a) shows a code or differential code determination of range R1 from a signal transmitter in a spacecraft or other system. A single representative signal channel is shown. Between the vertical dashed lines is the region of signal reception. The error in code range determination is approximately 1–3 meters.

Part (b) shows the range measurement as used to resolve the wide-lane integer cycle ambiguity. The sinusoidal curve has a wavelength $\lambda_{WL}$ of 15 m and represents a wide lane of ~15 m for dual signals separated by ~20 MHz. That is, a phase determination of the range has an error that is a multiple of $\lambda_{WL}$.

Part (c) shows an expanded view of a single wavelength $\lambda_{WL}$, or in other words of the wide-lane integer cycle ambiguity resolved by code ranging. The phase measurement $\phi_{WL}$ is the relative phase measurement of a wide-lane cycle and corresponds to an instantaneous position of the observer, modulo the integer wide-lane cycle count. The quantity $\epsilon(\phi_{WL})$ is the phase-measurement error of 2°≈8 cm for the wide lane. This is used in resolving the narrow-lane ($\lambda$=86 cm) integer cycle ambiguity.

Part (d) represents the narrow lane of 86 cm formed as the wavelength of the difference frequency between GPS L1 and L2 (or other frequencies). The relative phase measurement of the wide lane resolves the narrow-lane integer cycle ambiguity.

Part (e) shows an expanded view of the integer cycle ambiguity for the narrow lane resolved by the phase measurement of the wide-lane wavelength. The relative phase measurement of the narrow lane resolves the carrier integer cycle ambiguity.

Part (f) shows the same scale view of a carrier cycle ambiguity resolved by the relative phase measurement of the narrow-lane wavelength. The carrier wave has a wavelength $\lambda_c \cong 19$ cm. The relative phase of the carrier signal is shown as $\phi_c$. The carrier cycle measurement error $\epsilon_c$ is 4°≈2 mm.

In order to take full advantage of the technique described, it appears normally desirable (and probably necessary) to minimize the atmospheric propagation error contributors and to minimize the effects of the unmodelled errors in the spacecraft and the user equipment. This can be accomplished by the use of double differencing and related methods common in the current survey and geodetic fields. The very high precision of the measured observables provide significant advantages to using this process.

Thanks to the process just described, the 14.7 meter wide lane associated with a 20.46 MHz separation provides some significant advantages. This would allow users with rudimentary code differential capabilities (now at the 1–5 m. level), to determine quickly the correct integer wavelength of the 14.7 meter wide-lane signal. A moderate accuracy phase measurement (3–5 degrees) of the 14.7 m. wide-lane provides for a simple, reliable and rapid determination of the 86 cm L1/L2 wide-lane, and then an even more coarse phase measurement of that 86 cm lane provides an accurate resolution of the 19 cm L1 (and/or the 24.4 cm L2) carrier wavelength. This step-wise determination of the unambiguous carrier phase provides information that then can be used in the conventional determination of position from the L1 carrier phase measurements. This straightforward process provides the user with real time decimeter to centimeter accuracy without the need for sophisticated, costly software, as is now required.

Many of the signal advantages of the present invention (excellent accuracy, very low multipath, rapid reacquisition, etc.) would benefit aviation users. A listing of many of the features of this technique will now be set forth:

A difference frequency between L2c's of 20.46 MHz forms a very wide lane of ~14.7 meters.

Reliable access to a 14.7 m VWL (very wide lane) is provided by SPS (after SA) or code DGPS.

Phase measurement (~1–2%) of the VWL resolves the L1c/L2c (86 cm) wide lane (WL) cycle.

Phase measurement (~3–6%) of the WL (86 cm) resolves a 19 cm L1c carrier cycle to cm, mm.

Phase of 19 cm cycle gives cm, mm precision ranges for GPS solution with 4+ spacecraft (S/C).

No requirement for ambiguity resolution algorithms employing redundant S/C.

Differencing techniques can determine S/C and receiver unknown (unmodeled) bias errors.

Progressive VWL to WL to carrier technique gives real time PVT accuracy to cm, mm/s and ns.

System can operate with use of DGPS carrier phase corrections from earth reference, or operates autonomously based on S/C system position accuracy (~5–20 cm by 2005).

Data link feasible on both L2c (and/or both L1c) transmissions; at about 50 bps on each.

L2c and L1c DL's can carry DGPS and site data, tropo data, integrity, S/C biases, alerts, etc.

L2c and L1c transmissions can use C/A codes or more narrow-band signals if desired.

Progressive wide laning carrier phase technique reduces multipath to a very low level (a few cm).

Improved ionospheric correction obtained from higher precision measurements at L1 and L2.

L1c dual signals provide VWL and DL; provides improved signal availability and integrity.

L1c/L2c signal pairs provide ~86 cm wide lanes and ionospheric correction information.

L1c dual signals in ITU protected L1 band: robust, available, high-integrity signals for safety.

Technique provides useful, high-performance signals near ends of bands; efficient use of spectrum.

Very wide lanes used for rapid, reliable acquisition; system robust under signal loss conditions.

Signal arrangement compatible with techniques for obtaining improved code performance.

Technique provides a practical method for satisfying current and future GPS performance needs.

Since the L2 band is not protected, some aviation authorities state that the use of the L2 band could jeopardize safety-of-life applications unless the band is used exclusively for radionavigation satellite operations. The increased single signal availability of the dual signal arrangement in the L2 band may substantially mitigate these concerns. The L1 band is protected by ITU regulations and is being used by the FAA and other aviation authorities. The dual signals in the L1 band provide the rapid and reliable capabilities described for the invention and offers substantial advantages to future users in many safety critical and other applications. If a dual C/A-code signal in the L1 band is to replace the currently available centered C/A-code signal, a transitional period appears required.

While the GPS signal structure is specifically described and shown, it is contemplated that the invention is applicable to providing signals at or near the nulls of the GLONASS system and is applicable to possibly other systems.

The frequency separation between the split spectrum signals is an important characteristic of the present invention. The location of the P/Y code nulls is of secondary importance. There are some practical advantages and civil-military compatibility features to the arrangements of the preferred embodiments, although such arrangements in no way influence or restrict the operation of the split-spectrum technique.

Figure 5A:
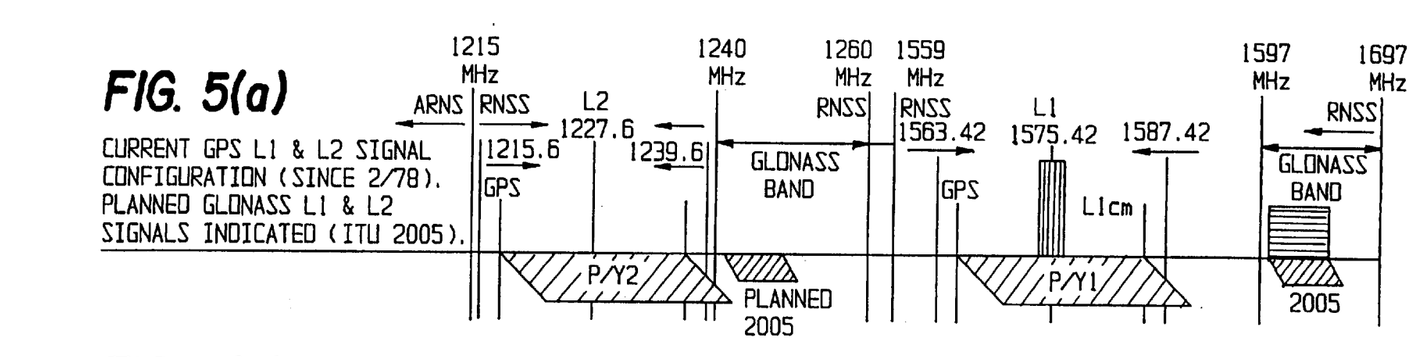
FIGS. 5(a), 5(b), 5(c), 5(d), 5(e), 5(f), 5(g), 5(h), 5(j) and 5(k) are schematic diagrams showing candidate civil and military signal configurations.
Figure 5B:
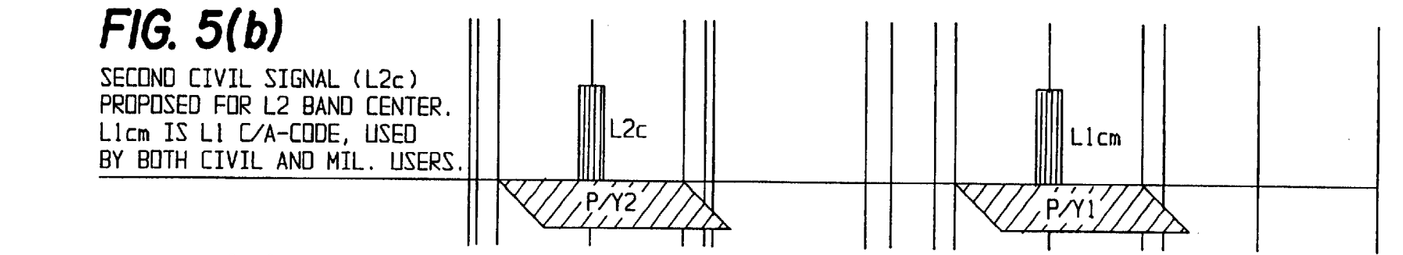
Figure 5C:
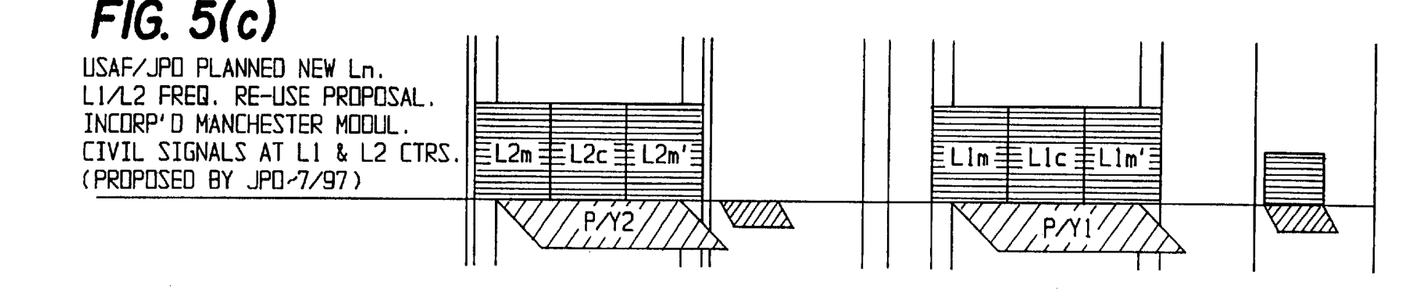
Figure 5D:
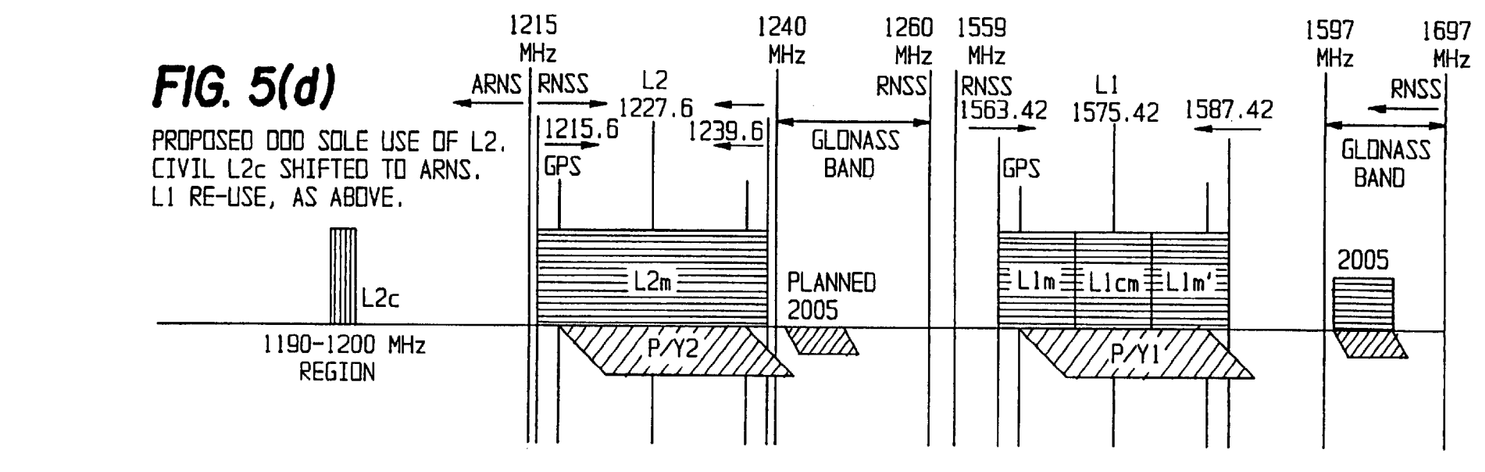
Figure 5E:
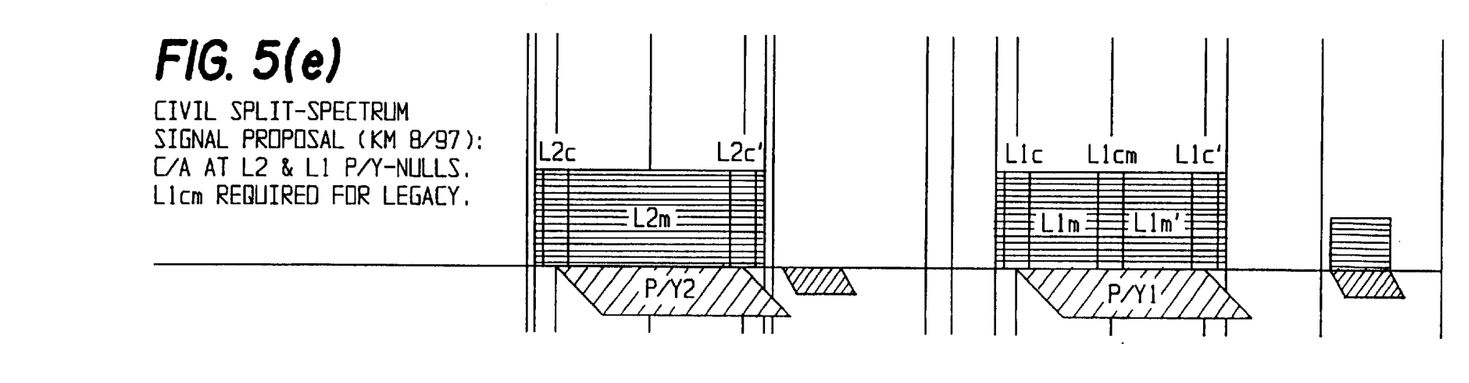
Figure 5F:
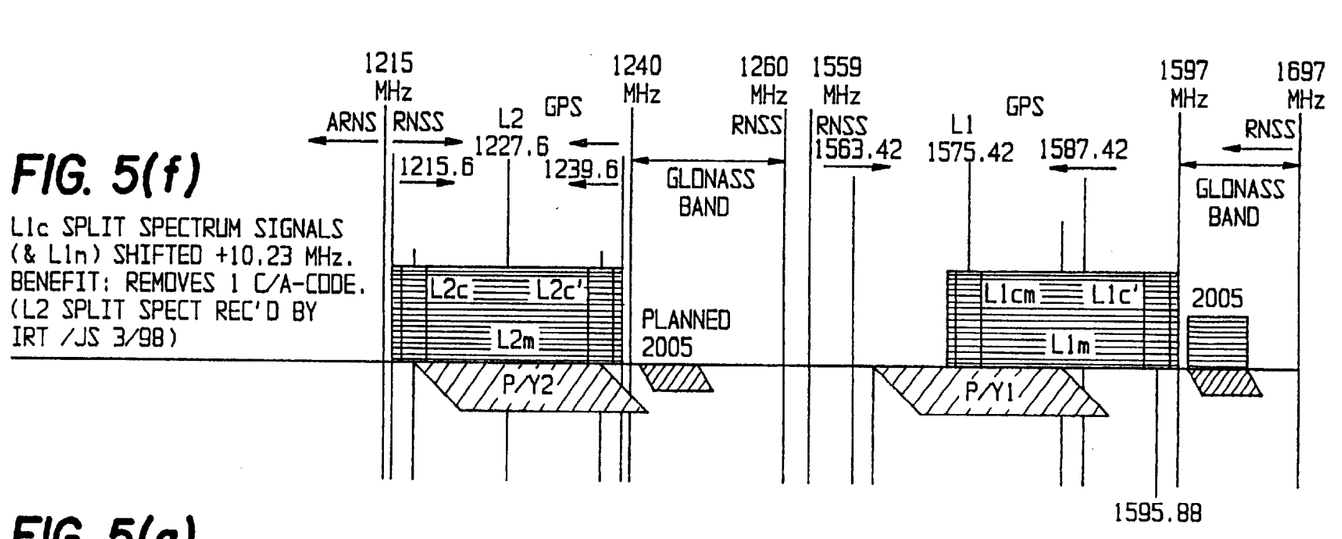
Figure 5G:
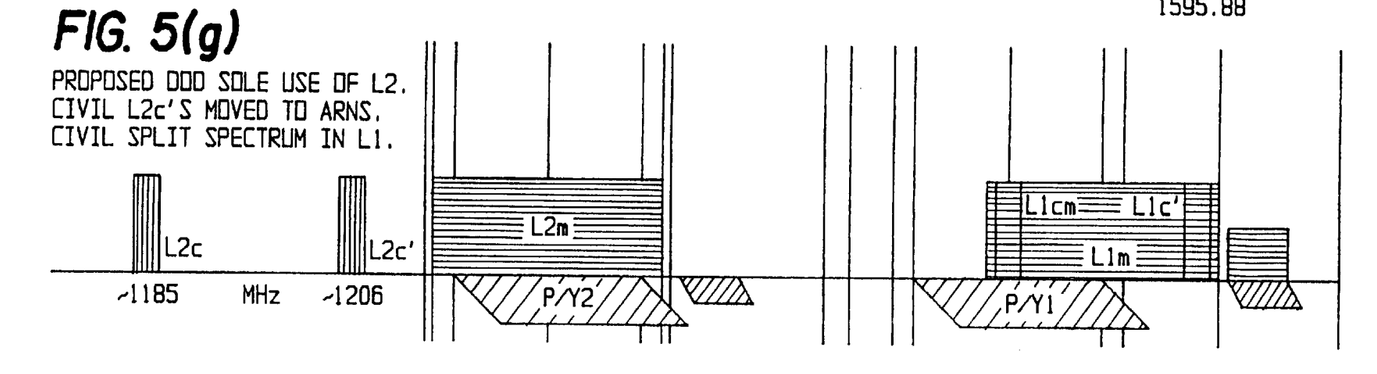
Figure 5H:
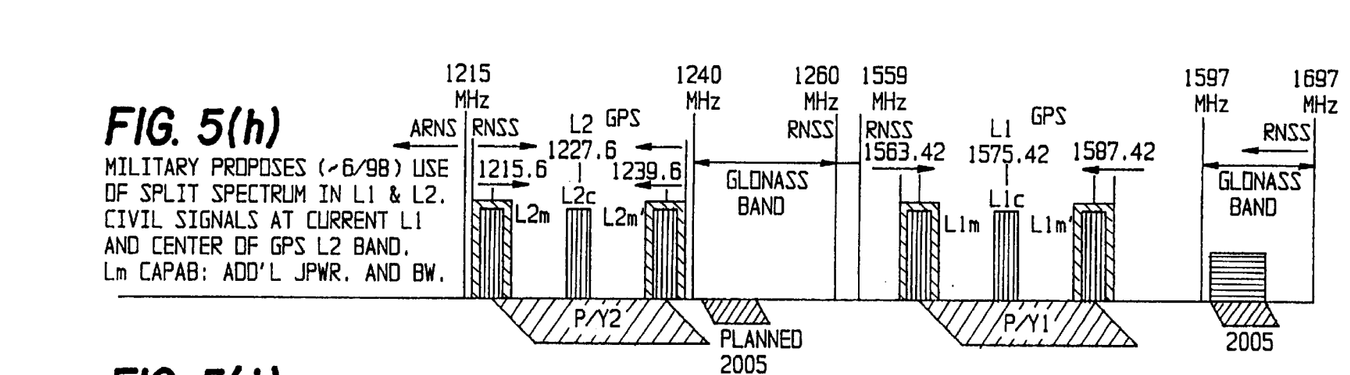
Figure 5J:
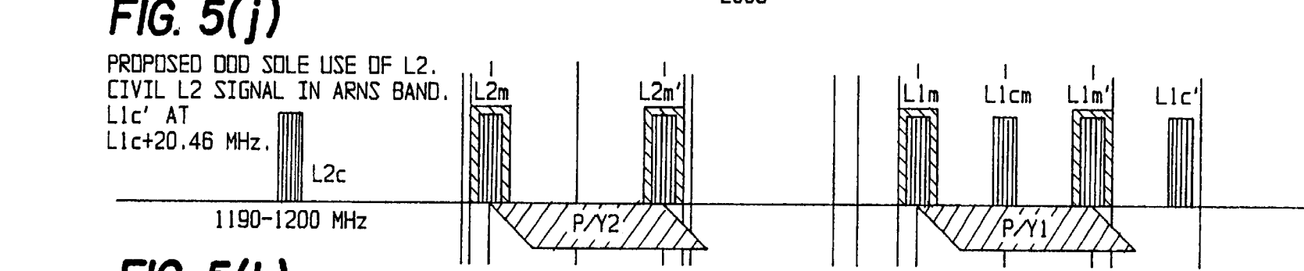
Figure 5K:
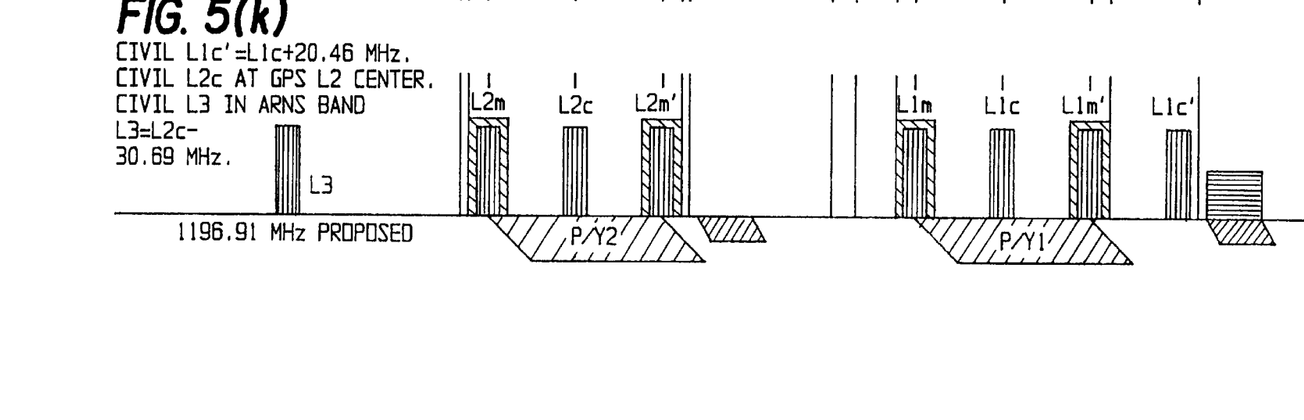

Various candidate civil and military signal configurations will now be described. FIG. 5(a) shows a current GPS L1 and L2 signal configuration used since February, 1978. Planned GLONASS L1 and L2 signals are indicated (ITU 2005). FIG. 5(b) shows a second civil signal L2c proposed for the L2 band center. L1 cm is an L1 C/A code used by both civil and military users. FIG. 5(c) shows a USAF/JPO planned new Lm L1/L2 frequency re-use signal, proposed by JPO in approximately July, 1997, incorporating Manchester modulation. The civil signals are at the L1 and L2 centers. FIG. 5(d) shows a proposed DOD sole use of L2, with the civil L2c shifted to ARNS and L1 reuse as above. FIG. 5(e) shows a civil split-spectrum signal proposal by the present inventor, with C/A at the L2 and L1 P/Y nulls. L1cm is required for legacy users. FIG. 5(f) shows L1c split spectrum signals and L1m shifted +10.23 MHz. The benefit is the removal of one C/A code. FIG. 5(g) shows the proposed DOD sole use of L2, with civil L2c's moved to ARNS and the civil split spectrum in L1. FIG. 5(h) shows a military proposal from June, 1998, for the use of split spectrum in L1 and L2. The civil signals are at the current L1 and the center of the GPS L2 band. FIG. 5(j) shows a proposed DOD sole use of L2. The civil L2 signals are in the ARNS band, and L1c' is at L1c+20.46 MHz. FIG. 5(k) shows a civil L1c' at L1c+20.46 MHz, civil L2c at the GPS L2 center, and the civil L3 in the ARNS band, with L3=L2c−30.69 MHz.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. For example, the applicability of the present invention is not limited to GPS and GLONASS, but instead can be extended to other radionavigation systems or to other areas of endeavor. Accordingly, it is intended that the invention be limited only to the extent required by the appended claims and the applicable rules of law.

What is claimed is:

1. A method of making a determination of at least one of a position of an object, a time at which the determination is made, a speed of the object, and an attitude of the object, the method comprising:
   (a) receiving a plurality of signals from spatially separated sources, each of the plurality of signals having at least one high rate code and at least three coded signals, the at least three coded signals comprising a legacy signal and at least one split spectrum signal, two of the at least three coded signals having a frequency separation $\Delta f$ which provides a wide lane of wavelength $\lambda$, $\lambda$ being related to $\Delta f$ by $\lambda = c/\Delta f$, c being the speed of light;
   (b) obtaining a phase measurement of a phase difference between the at least two coded signals from the wide lane;
   the high rate code and the phase difference containing information permitting the determination; and
   (c) making the determination in accordance with the high rate code and the phase measurement obtained in step (b).

\* \* \* \* \*